M. H. McKENNA.
MOTOR TRUCK LOADING WINDLASS.
APPLICATION FILED SEPT. 8, 1921.
1,433,289. Patented Oct. 24, 1922.
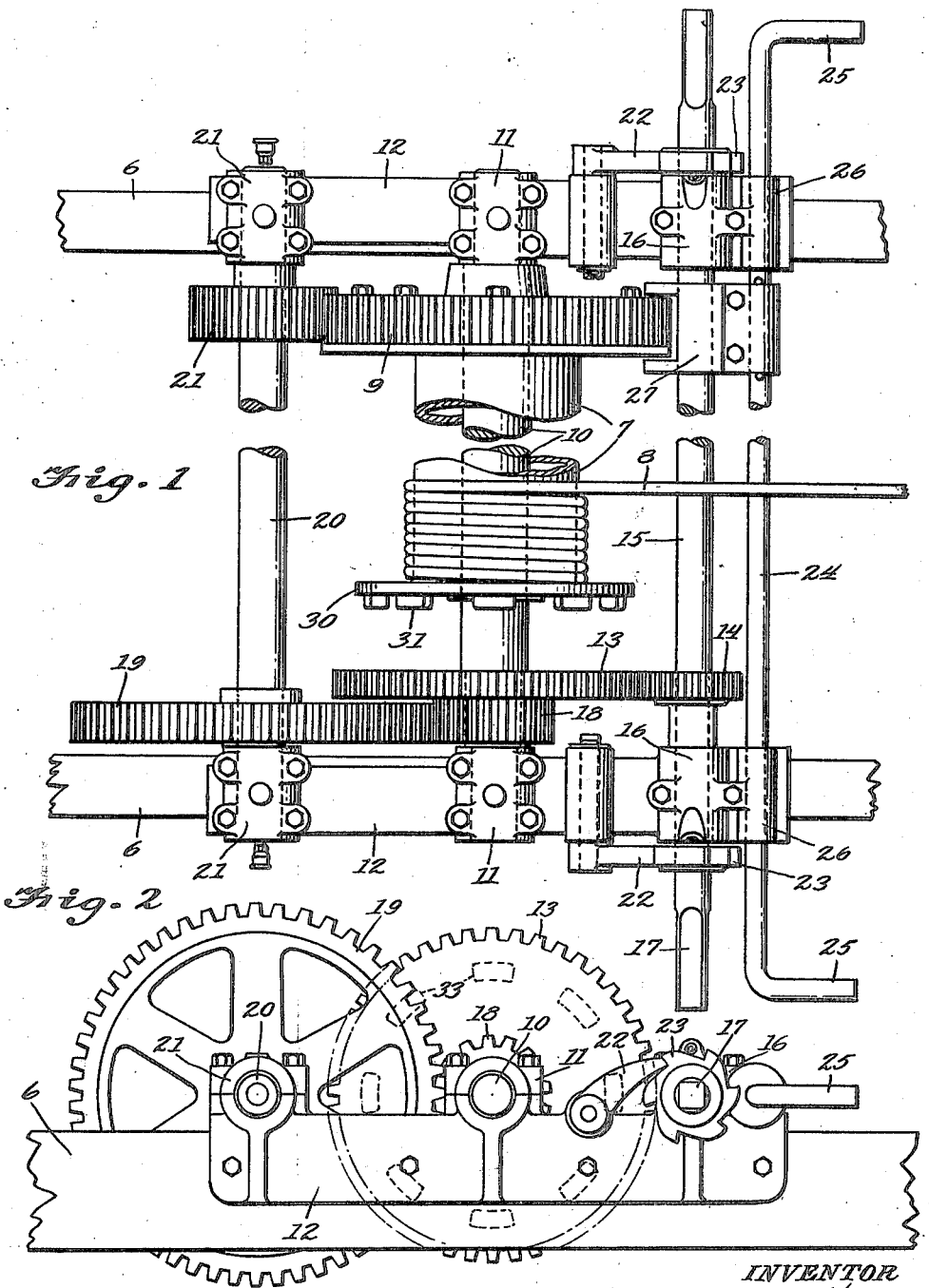
INVENTOR
M. H. McKenna
BY John A. Brumbart
ATTY Patented Oct. 24, 1922.

1,433,289

UNITED STATES PATENT OFFICE.

MICHAEL H. McKENNA, OF CLEVELAND, OHIO.

MOTOR-TRUCK-LOADING WINDLASS.

Application filed September 8, 1921. Serial No. 499,152.

*To all whom it may concern:*

Be it known that I, MICHAEL H. MC-KENNA, a citizen of the United States, residing at Cleveland, in the county of Cuyahoga and State of Ohio, have invented certain new and useful Improvements in Motor-Truck-Loading Windlasses, of which the following is a specification.

This invention relates to a windlass especially adapted and intended for loading a motor truck, and the object of the invention is to provide an improved windlass which can be installed on almost any truck and so located that it can be operated by hand to lift loads on the truck. A feature of the windlass is a double speed arrangement, a high speed for lifting light loads and a low speed for heavy loads. These speeds are controlled by a novel shift of the winding drum and the gearing which operates the drum, the shift being very simple and effective for the intended purpose.

The windlass is illustrated in the accompanying drawings in which Fig. 1 is a plan thereof, and Fig. 2 is a side elevation.

As stated, the windlass is particularly adapted for mounting on an automobile or other truck, and in the drawing, 6 indicates the two side frames of the chassis of such a truck. 7 is a drum which winds the hoisting or pulling cable 8, and this drum is bolted to a gear 9, and both are loose on a shaft 10 which turns in bearings 11 mounted on side sills 12 which are secured to the frames 6. A spur gear 13 is fast on the shaft 10, and this gear meshes with a pinion 14 carried by a power shaft 15 which is mounted in bearings 16 on the sills. A crank may be applied to either end 17 of the shaft 15 for the purpose of turning the same.

The shaft 10 also carries a pinion 18 which meshes with a spur gear 19 fast on a jack shaft 20 which turns in bearings 21 on the side sills, and also fast on the shaft 20 is a pinion 21 which may mesh with the spur gear 9 which as stated is bolted to the drum 7.

Dogs 22 and ratchets 23, the latter on the shaft 15, are provided to prevent back slip when desired.

The shifting device consists of a rod 24 having a handle 25 at each end, and this rod is slidable lengthwise in bearings 26 on the sills, and carries a fork 27 the branches of which engage the opposite sides of the gear 9.

The end of the drum 7 opposite the gear 9 is provided with a clutch member 30 having projections 31 adapted to engage in recesses 33 (indicated in dotted lines in Fig. 2) in the adjacent side of the spur gear 13.

In Fig. 1 the windlass is shown shifted for low speed. In this case, when the shaft 15 is turned by hand the drive is through the pinion 14, gear 13, pinion 18, gear 19, shaft 20, pinion 21 and gear 9 to the drum 7, the drum and gear 9 having been bodily shifted on the shaft 10 to the position shown, where the gear 9 engages the pinion 21. This provides a very powerful reduction gearing.

For the high speed, the shifter rod 24 is operated to shift the gear 9 and drum 7 on the shaft 10 until the clutch projections 31 engage in the recesses 33 in the side of the gear 13. This clutches the drum to that gear, and disengages the gear 9 from the pinion 21. Then, the power is applied from the shaft 15 through the pinion 14 to the gear 13 and directly to the drum, the other gearing running free or idle.

Hence by the simple device of the shift of the drum and its attached gear either speed may be used, and a very efficient device is provided for the intended purpose.

I claim:

1. In a windlass, the combination of a power shaft, a drum shaft, a drum thereon having a clutch member at one end and a gear at the other end, a reduction gearing between the power shaft and said gear, and means to shift the drum and its gear to engage the clutch member with one of the intermediate gears of the reduction gearing and disengage the drum gear from said reduction gearing, or vice versa.

2. In a windlass, the combination of a power shaft, a drum shaft, a winding drum loose on the drum shaft and shiftable lengthwise thereon, a drum gear fixed to the drum, a clutch member fixed to the drum, and a reduction gearing operated by the power shaft, the drum and drum gear being shiftable to engage the latter with the reduction gearing or to engage the clutch member with one of the intermediate gears of the reduction gearing.

3. In a windlass, the combination of a power shaft, a drum shaft, a jack shaft, a winding drum having a drum gear secured to one end thereof and a clutch member at the other end thereof, said drum, gear and clutch member being shiftable along the shaft, a reduction gearing operated by the power shaft and including a gear on the drum shaft provided with another clutch member and a pinion on the jack shaft engageable with the drum gear, and means to shift the drum and drum gear to engage the latter with said pinion or to engage the clutch member on the drum with said clutch member on the gear.

4. In a windlass, the combination of a power shaft, a reduction gearing driven thereby, and a drum having a gear engageable with the final member of the reduction gearing and also having a clutch engageable with one of the intermediate members of the reduction gearing, and means to shift the drum lengthwise to effect the respective engagements.

5. In a windlass, the combination of a power shaft, a drum shaft, a reduction gearing driven by the power shaft and including a combined gear and clutch member mounted on the drum shaft, a drum loose on the drum shaft and provided at one end with a gear engageable with the final member of the reduction gearing and at the other end with a clutch member engageable with said combined gear and clutch member of the reduction gearing, and means to shift the drum and drum gear on the drum shaft to effect the respective engagements.

In testimony whereof, I affix my signature in presence of two witnesses.

MICHAEL H. McKENNA.

Witnesses:
JOHN A. BOMMHARDT,
EDWARD J. HOBDAY.